United States Patent
Mandzukic et al.

(10) Patent No.: US 10,994,936 B1
(45) Date of Patent: May 4, 2021

(54) INNER CLEANING SYSTEM FOR ENDLESS BELT CONVEYOR

(71) Applicants: Mayfran International Inc., Mayfield Village, OH (US); Tsubakimoto Mayfran Inc., Shiga (JP); Mayfran Limburg B.V., Landgraaf (NL)

(72) Inventors: Mark Andrew Mandzukic, Strongsville, OH (US); Ryuichi Hori, Shiga (JP); Nebojsa Petrovic, Seven Hills, OH (US); Rene Martin Sieben, Amsterdam (NL); John Joseph Zolcak, Mentor, OH (US)

(73) Assignees: Mayfran Limburg B.V., Landgraaf (NL); Mayfran International Inc., Mayfield Village, OH (US); Tsubakimoto Mayfran Inc., Shiga (JP)

( * ) Notice: Subject to any disclaimer, the term of this patent is extended or adjusted under 35 U.S.C. 154(b) by 0 days.

(21) Appl. No.: 16/718,617

(22) Filed: Dec. 18, 2019

(51) Int. Cl.
  *B65G 15/28* (2006.01)
  *B65G 45/20* (2006.01)
  *B65G 45/18* (2006.01)
  *B65G 21/16* (2006.01)

(52) U.S. Cl.
  CPC ............ *B65G 15/28* (2013.01); *B65G 21/16* (2013.01); *B65G 45/18* (2013.01); *B65G 45/20* (2013.01)

(58) Field of Classification Search
  CPC ........ B65G 45/12; B65G 45/14; B65G 45/16; B65G 45/18; B65G 45/26
  See application file for complete search history.

(56) References Cited

U.S. PATENT DOCUMENTS

| 689,881 A | * | 12/1901 | Hoy | ............ B65G 45/12 198/497 |
| 2,859,864 A | * | 11/1958 | Ibaugh | ............ B65G 45/12 198/497 |

(Continued)

FOREIGN PATENT DOCUMENTS

| EP | 1256417 B1 | 8/2006 | |
| EP | 2647279 B1 | * 12/2014 | ............ A01D 87/02 |
| JP | 3466983 B2 | 11/2003 | |

OTHER PUBLICATIONS

Kim, Harry; International Search Report and Written Opinion of the International Searching Authority issued in International Application No. PCT/US2020/061147; dated Dec. 28, 2020; 6 pages.

*Primary Examiner* — William R Harp
(74) *Attorney, Agent, or Firm* — Ulmer & Berne LLP (57) ABSTRACT

A conveyor comprises an endless belt and a belt return device. The endless belt comprises an upper run and a lower run and is configured to convey conveying material in a conveying direction. An intermediate space is defined between the upper run and the lower run. The belt return device facilitates transitioning of the endless belt between the lower run and the upper run. The endless belt defines at least one passage opening which allows the exit of at least a portion of an intermediate space material which is formed by a portion of the conveying material which has reached the intermediate space. At least a portion of the endless belt comprises a conveyor track and a passage track. The passage track defines the at least one passage opening. The conveyor track and the passage track are arranged side by side in the conveying direction.

22 Claims, 10 Drawing Sheets

(56) References Cited

U.S. PATENT DOCUMENTS

| | | | | |
|---|---|---|---|---|
| 2,906,396 A | * | 9/1959 | Krauss | E02F 7/00 |
| | | | | 37/390 |
| 3,944,050 A | * | 3/1976 | Kane | B65G 23/44 |
| | | | | 198/497 |
| 4,321,996 A | * | 3/1982 | Sancken | B65G 21/20 |
| | | | | 198/499 |
| 4,770,291 A | * | 9/1988 | Shaw | B65G 17/067 |
| | | | | 198/822 |
| 5,115,906 A | * | 5/1992 | Yamaguchi | B65G 15/42 |
| | | | | 198/494 |
| 6,511,597 B2 | * | 1/2003 | Hori | B23Q 11/0825 |
| | | | | 210/298 |
| 7,281,625 B2 | * | 10/2007 | Wilmo | B65G 15/42 |
| | | | | 198/495 |
| 10,427,261 B2 | | 10/2019 | Cheng | |
| 2016/0016271 A1 | | 1/2016 | Tak et al. | |
| 2016/0263500 A1 | | 9/2016 | Pluvinage et al. | |

* cited by examiner

INNER CLEANING SYSTEM FOR ENDLESS BELT CONVEYOR

TECHNICAL FIELD

The articles described below generally relate to a conveyor device for pourable conveying material.

BACKGROUND

Conveyors can enable removal of pourable conveying material (e.g., bulk materials) that accumulate when machining materials, such as metallic materials such as steel, aluminum, brass, especially chips. In this case, the resulting material—often together with a liquid coolant and/or lubricant—is supplied from the conveyor for disposal or recycling. The conveyor may at the same time have a filter function with which the liquid coolant and/or lubricant is separated from the solid material and fed to a further use or to a collective supply. The endless belt may have different configurations and, for example, be designed strap-, band- or belt-shaped, or be designed as a hinge.

In conveyors with endless belts, the endless belt is guided between at least two deflecting apparatuses and passes through an upper path, referred to below as the upper run, and a lower path, referred to below as the lower run. Generally, the upper run serves to convey the material to be conveyed from a loading area to an unloading area, while the lower run represents the return run.

It cannot be ruled out that parts of the material to be conveyed reach the area between the upper run and the lower run, referred to below as the intermediate space, and following gravity end up on an intermediate space side of the endless belt in the lower run, said intermediate space side facing the upper run. If the pourable conveying material consists of chips from material processing, these generally have a length from under about 1 mm to about 10 mm and more. The material which has reached the intermediate space side of the endless belt in the lower run is referred to below as the intermediate space material. Lying on the driven endless belt, the intermediate space material gets into the area of the belt return, where it can contaminate parts of the belt return device, such as gears or pulleys, or pile up on it. The intermediate space material, which does not adhere to the belt return device, in turn falls on the intermediate space side of the endless belt in the lower run and can thus again reach the belt return device. With additional material which passes through the upper run or past it into the intermediate space, the intermediate space material continuously accumulates in the area of the belt return device. In particular, chips tend to snag and form larger clew-like structures. It may cause malfunction or damage in the area of the belt return device, which may require expensive cleaning, repair or maintenance.

From JP 3466983 B2 a conveyor for chips from metal machining is known, which proposes to use fixed pulleys for the band return device instead of gears, on which pulleys guide chains of the endless belt can roll. The absence of gear teeth is intended to prevent or at least complicate a settling of the intermediate space material at the band return device. A similar solution is known from U.S. Pat. No. 10,427,261 B2, in which annular deflecting elements serve as a band return device for the endless belt. Material that has arrived in the intermediate space between the lateral guide chains of the endless belt is to be pressed by the contact with the deflecting element into the outer area, where it is taken away by cross struts and fed to the unloading area. This solution only affects the material accumulating in the guide chains. A solution for intermediate space material, which accumulates in the area between the guide chains, is not offered.

US 2016/0263500 A1 discloses a conveyor of the type concerned here, in which a filter box is arranged between the upper run and the lower run. Chips that have entered the intermediate space between the upper run and the lower run do not enter the interior of the filter box, while filtered liquid is supplied via outlet openings to a tank for the filtrate. Inside the filter box at least one brush is arranged, which sweeps over the filter surfaces of the filter box and frees them from deposited chips. The chips thus remain in the intermediate space and can lead to the disadvantages described above.

From EP 1 256 417 B1 a conveyor for chips from metal machining is known, in which the endless belt being a hinge runs between a lower band return device and an upper band return device, wherein the upper band return device is at the same time a chip removal end, at which the transported chips fall from the conveyor into a collecting tank. To avoid the problems with the intermediate space material, a separating plate is to be provided in the intermediate space of the conveyor, which plate extends from the lower belt return device into the vicinity of the chip removal end. Material parts that reach the intermediate space and the lower run are to be guided by means of cross bars that are arranged on the intermediate space side of the endless belt, via the belt return device onto the separating plate and along the separating plate to a discharge mechanism. The discharge mechanism includes an opening in the separation plate and a chute or auger which laterally removes the material falling through the opening. The disadvantage here is the need to ensure a separating plate extending almost over the entire length of the conveyor with a corresponding cost of materials and a reliable transport along this separation plate over its entire extent. Finally, a separate discharge mechanism for the intermediate space material must be provided.

US 2016/0016271 A1 discloses a conveyor for removing chips arising during metal machining, in which the endless belt, which is designed as a hinge, has members which can open or close depending on the position. In the upper run of the conveyor intended for the transport of the chips in the direction of a deposit point, the members are closed and thus contribute to the transport of the chips. In the lower run, however, the members open automatically, following gravity, so chips that have arrived in the intermediate space between lower run and upper run, can fall through the open members from out of the intermediate space onto a housing bottom of the conveyor. From there, the chips can be transported to the upper run by means of outer strips arranged on the outside of the endless belt and supplied for disposal. The automatically opening members extend over the entire width of the surface of the endless belt intended for transport in the upper run. The opening members mean additional expense in manufacturing the endless belt and a further risk of mechanical failure of the system.

SUMMARY

The present disclosure generally relates to a conveyor which enables the removal of the intermediate space material from the intermediate space reliably and with reduced expenditure compared with the prior art. In accordance with one embodiment, the conveyor comprises an endless belt and a belt return device. The endless belt comprises an upper run and a lower run and is configured to convey conveying material in a conveying direction. An intermediate space is defined between the upper run and the lower run. The belt return device facilitates transitioning of the endless belt between the lower run and the upper run. The endless belt defines at least one passage opening which allows the exit of at least a portion of an intermediate space material which is formed by a portion of the conveying material which has reached the intermediate space. At least a portion of the endless belt comprises a conveyor track and a passage track. The passage track defines the at least one passage opening. The conveyor track and the passage track are arranged side by side in the conveying direction.

If, in the following in the representation of the embodiments of the disclosure, a conveyor track or passage track is mentioned for the sake of simpler linguistic representation, this does not limit the respective embodiment to the special case of exactly one conveyor track or exactly one passage track. Unless expressly stated otherwise, the solutions always apply to the case of multiple conveyor tracks and/or passage tracks, for example for a conveyor track between two passage tracks or a passage track between two conveyor tracks.

Unlike the prior art, therefore, the endless belt is divided in total or on at least one section into two adjacent tracks, one of which, namely the conveyor track, substantially serves to convey the conveying material and the at least one passage track as much as possible serves to pass the intermediate space material through the endless belt when located in the lower run.

It is advantageous to arrange a plurality of passage tracks in the conveying direction at a distance from each other. The result is increased stability of the endless belt. In addition, more material can thus be conveyed on the outside of the endless belt in the upper run, since a greater width for conveying is available on band sections without passage track.

The conveyor according to the present disclosure may comprise at least one deflection means, wherein the at least one deflection means is arranged to guide at least a portion of an intermediate space material, which is formed by a proportion of the conveying material which has reached an intermediate space between upper run and lower run, in a direction towards the passage track. As a result, the efficiency of the removal of the intermediate space material is increased.

In particular, it may be advantageous if the conveyor according to the present disclosure is designed such that the at least one deflection means is arranged between the upper run and the lower run and comprises at least one deflection strip extending obliquely to the conveying direction. When the endless belt is running, the intermediate space material can contact the at least one deflection strip and is deflected by the latter in the direction towards the passage track. The at least one deflection strip can act on the intermediate space material resting on the lower run and lead this directly to the passage track. However, it is also conceivable that the intermediate space material does not yet pass directly through the deflection to the passage track and initially at least once more passes through the belt return device. The intermediate space material can then reach the passage opening or one of the passage openings by separate measures or during a later passage.

However, the conveyor according to the present disclosure can also be designed such that the at least one deflection strip cooperates with the upper run in order to deflect the intermediate space material in a direction towards the passage track. For this purpose, the at least one deflection strip can extend from a base plate of the deflection means in the direction of the upper run. Intermediate space material still hanging on the upper run is stripped away in the driven endless belt and/or deflected in the direction towards the passage track. Intermediate space material which reaches the base plate of the deflection means, can also be deflected further in the direction towards the passage track by the conveying movement of the endless belt in interaction with the at least one deflection strip It is also possible to provide at least two deflection strips, of which at least one cooperates with the upper run and at least one with the lower run. In this case, all the deflection strips may belong to the same deflection means, i.e. be fixed, for example, on the same base plate. More deflection strips can also interact with the upper run and/or more deflection strips with the lower run. In this case, the deflection strips, which cooperate with the same run, can be aligned parallel to each other. In this case, the deflection means can be kept relatively short, e.g. have a length which does not exceed the width of the endless belt, and the intermediate space material reaches the passage track after several passes at the latest. But deflection strips cooperating with the same run but with different portions of the width of the endless belt may be oriented non-parallel therewith deflecting the intermediate space material in different directions. This may be useful, in particular, if at least two adjacent passage tracks spaced apart from one another are present.

The conveyor according to the present disclosure can also be designed such that the at least one deflection means has at least one drop opening in a base plate. Thus, the intermediate space material, which has reached the base plate of the deflection means arranged between the upper run and lower run, can fall through the at least one drop opening onto the lower run or through one of the passage openings in the lower run.

In this case, the conveyor according to the present disclosure can also be designed so that below the drop opening or under at least one of the drop openings a sliding member extends which is obliquely oriented to the gravitational direction. The sliding member acts as a chute and directs the passage of the intermediate space material through the associated drop opening in the desired direction, namely in the direction towards the area for the at least one passage track in the lower run. It can be provided that under each drop opening, each has their own sliding member. But it is also conceivable to provide a common sliding member for at least two adjacent drop openings, adjacent in the transport direction or transversely to the transport direction.

Furthermore, the conveyor according to the present disclosure can be designed such that the belt return device has deflecting guides and a peripheral wall extending in the axial direction of the belt return device between the deflecting guides, the peripheral wall cooperating with the endless belt for transporting the intermediate space material around the belt return device.

Depending on the structure of the deflection means, a part of the intermediate space material only reaches the passage track or one of the passage tracks after at least one revolution around the belt return device. In order to facilitate the circulation of the space material around the belt return device, the peripheral wall, in cooperation with the endless belt, can prevent falling-off of the intermediate space material during the revolution. Ideally, the peripheral wall also has such a radial distance to the area of the endless belt transporting the intermediate space material during circulation, which radial distance, on the one hand, provides space to the intermediate space material but on the other hand prevents falling of the intermediate space material.

The conveyor according to the present disclosure can also be designed such that the endless belt has elevated structures on its inner side facing the intermediate space and/or the peripheral wall of the deflecting device, which structures cooperate with the deflecting device for transporting the intermediate space material. The elevated structures can serve other purposes at the same time, for example, on the endless belt for fastening elements of the endless belt, such as link plates, if the endless belt is a hinge. Thus, joint sleeves of the link plates encompassing joint rods can be elevated relative to the link plates on the side facing the intermediate space and thus support the transport of the intermediate space material. The belt return device and the endless belt are set up such that the elevated structures facilitate the transport of the intermediate space material around the belt return device from the lower run to the upper run.

Furthermore, the conveyor according to the present disclosure can be designed such that the elevated structures of the endless belt comprise at least one pushing element extending at least partially over the width of the conveying track. The pushing element extends from the endless belt in the direction of the intermediate space and ensures that the intermediate space material is transported further in case of contact with the at least one deflection strip. The pushing element may be a strip of solid material. In addition to the at least one strip, at least one further elevated structure may be provided. In particular, it may be advantageous if the pushing element or at least one of the pushing elements is flexible or has a flexible lining for example using flexible materials like rubber or by using a brush or brush-like attachments, so that with the flexible element or with the bristles of the brush substantially all intermediate space material on the deflection means, in particular in the region of at least one deflection strip or in case of several deflection strips, the intermediate space material located between deflection strips is reached.

For protecting the side regions of the endless belt, in particular if these side regions have a conveyor chain, the deflection means and/or the belt return device can have at least one lateral protective wall which prevents the passage of the intermediate space material, in particular the deflected intermediate space material, to the side area, for example to the conveyor chains.

The conveyor according to the present disclosure can also be designed so that the at least one deflection means comprises an auger. The auger can be used as an alternative or in addition to the at least one deflection strip.

It can be provided according to the present disclosure that the auger is fixed. Fixed means that the auger does not rotate relative to the housing of the conveyor. The fixed auger can be arranged on or in the belt return device. The at least one screw thread of the fixed auger comes so close to the endless belt that the conveying material located on the intermediate space side of the endless belt is laterally deflected by the screw thread in the desired direction when the endless belt is driven.

Alternatively, the auger may also be driven, so that the intermediate space material which has entered the auger is actively moved by the auger, i.e. deflected in the sense of the present disclosure. The drive of the auger can be done via the driven endless belt or by means of a separate motor.

Both in the fixed auger and in the driven auger, at least two areas with different orientation of the screw thread can be provided. Thus, the auger can deflect the intermediate space material in opposite directions. The latter is particularly useful if more than one passage track is present in the endless belt.

In the case of the driven auger, the conveyor may be formed so that the driven auger is enclosed by a housing. The housing or a part thereof may at the same time be the peripheral wall of the belt return device which supports the circulation of the intermediate space material around the belt return device.

The conveyor according to the present disclosure can also be designed so that the housing enclosing the driven screw conveyer has at least one inlet opening for the intermediate space material extending above the longitudinal axis of the auger. Since the endless belt runs with its intermediate space side over the inlet opening of the housing, at least a portion of the intermediate space material passes into the housing and thus to the auger.

The housing which encloses the driven auger can have an outlet opening for the intermediate space material, wherein the outlet opening is above an endless belt region designated for the passage track.

The auger, in particular the driven auger, can also be arranged at a distance from the belt return device.

The conveyor according to the present disclosure can also be designed so that it comprises above the upper run a cover covering the passage track. The covering shall prevent the conveying material to enter the passage opening(s) in the passage track. In case of a plurality of passage tracks an according number of covers can be provided to cover all of the passage tracks. The cover(s) can extend over a part of the upper run or along its complete length. At least a part of the cover can be provided by a portion of a frame of a feed opening. In this case covering of the passage track remote from the feed opening can be provided by additional cover means.

Exemplary embodiments of the conveyor according to the present disclosure are illustrated below with reference to figures.

BRIEF DESCRIPTION OF THE DRAWINGS

It is believed that certain embodiments will be better understood from the following description taken in conjunction with the accompanying drawings in which.

DETAILED DESCRIPTION

Figure 1:
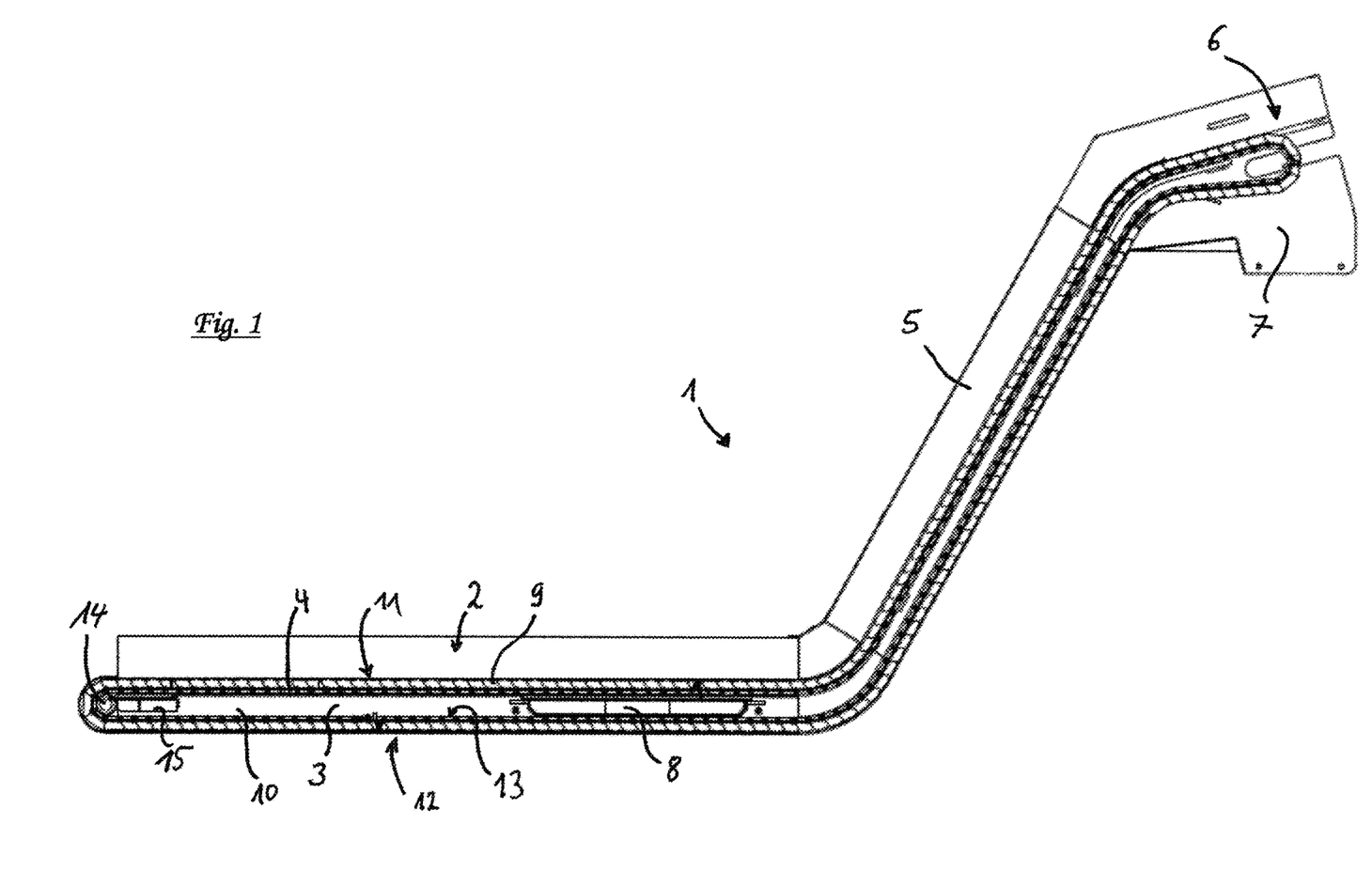
FIG. 1 shows a first conveyor for removing chips with an internal filter box.
Figure 5:
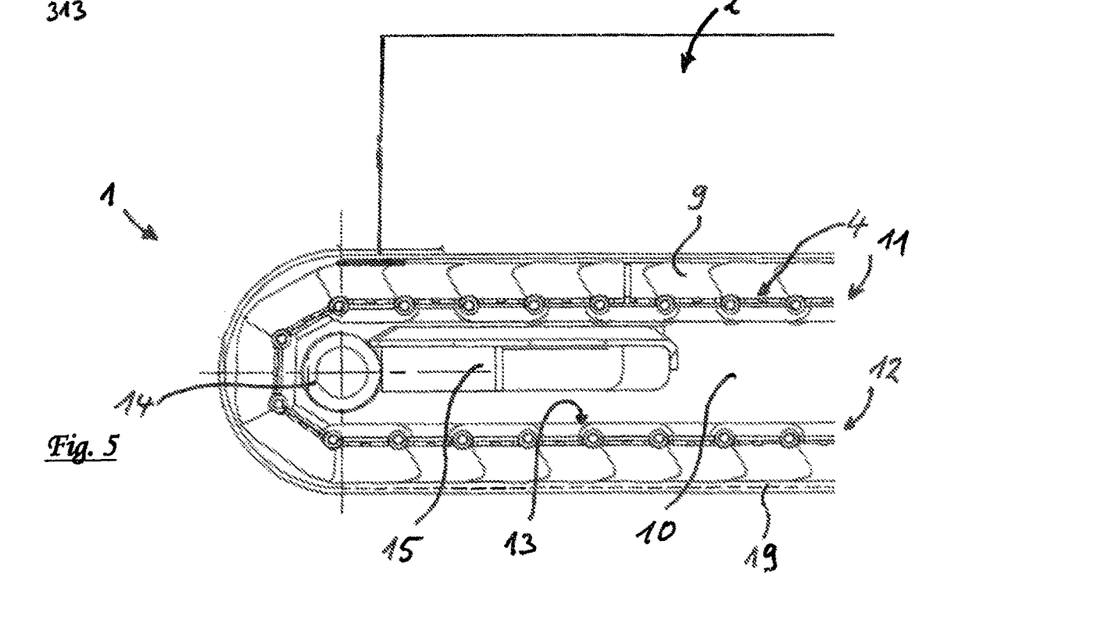
FIG. 5 shows an enlarged detail of a front end of one of the conveyors.

FIG. 1 schematically shows in cross-section a first conveyor 1 (hereinafter conveyor), of which in FIG. 5, the front (in the illustration in FIG. 1 the left) end is enlarged. Such a conveyor 1 is used for removing chips that are produced during metal machining and are filled together with a liquid coolant via a feed opening 2 into a tank 3 of the conveyor 1. An endless belt 4 is arranged in the conveyor 1 and driven by a motor, not shown here. Chips that reach the endless belt 4 via the feed opening 2 are conveyed with the driven endless belt 4 via an ascending piece 5 of the conveyor 1 to an ejection end 6, where they drop from the endless belt through a discharge chute 7 into a collecting container, not shown here.

In the tank 3 of the conveyor 1 is a filter box 8, which is surrounded with a filter material and is permeable to the liquid coolant, but which prevents the entry of solid material, in particular chips. From the interior of the filter box 8, the filtrate is fed to a clean tank, not shown here, and can be used again as a coolant. Means not shown here may be provided for stripping away chips adhering to the outer circumference of the filter box, for example with strips or brushes which are carried along by the endless belt 4.

Even if the endless belt 4 preferably has side walls 9, it cannot be ruled out that chips fall into an intermediate space 10 between upper run 11 and lower run 12 and attach to the intermediate space side 13 of the endless belt 4 facing the intermediate space 10 in the lower run 12.

The endless belt 4 is guided at a first belt return device 14 from the lower run 12 into the upper run 11. For this purpose, gears or pulleys with a smooth surface (not shown in the illustration) can be used. The driving of the endless belt 4 takes place, for example, in the region of the discharge end 6 via drive gears, not shown here, or via alternative drive possibilities.

The chips (not shown) that are deposited in the intermediate space 10 and in particular on the intermediate space side 13 of the endless belt 4 in the lower run 12 are problematic for the first belt return device 14. Without special measures, the chips accumulate on the belt return device 14 or in its area and can interfere with the operation of the conveyor device 1. In this case, elaborate cleaning measures are required.

Figure 2:
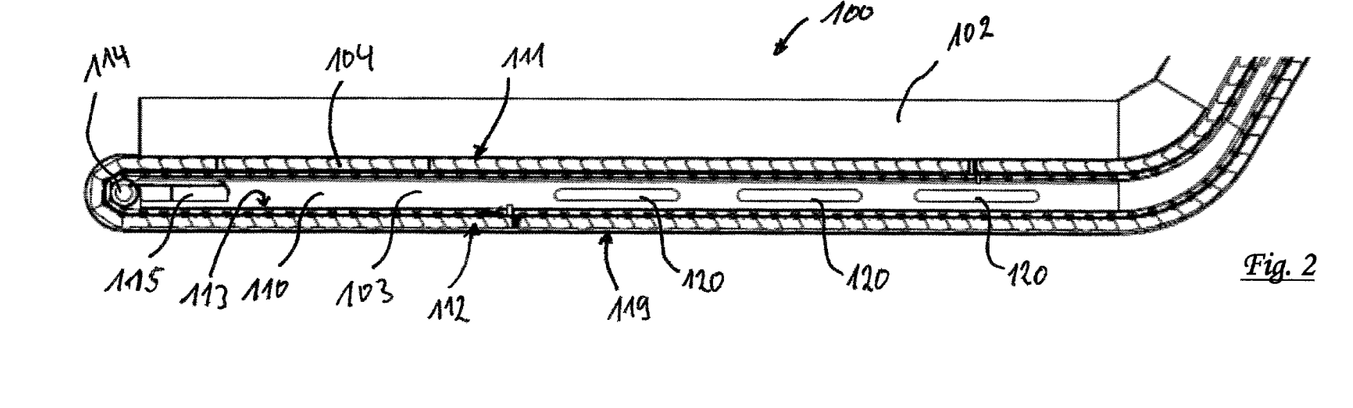
FIG. 2 shows the front part of a second conveyor for removing chips.
Figure 3:
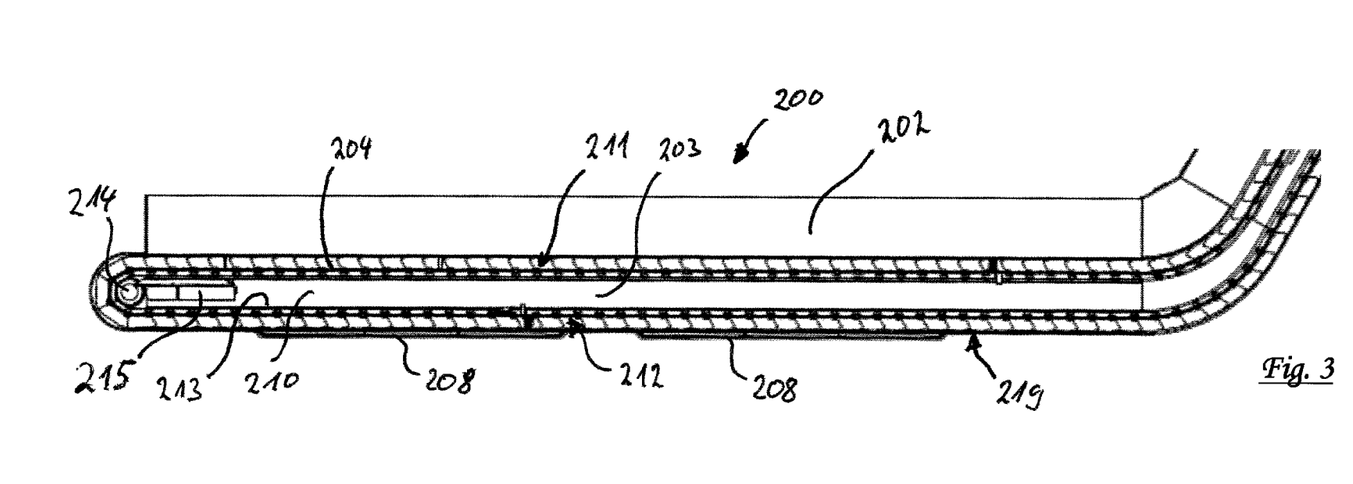
FIG. 3 shows the front part of a third conveyor for removing chips with lower filter systems.
Figure 4:
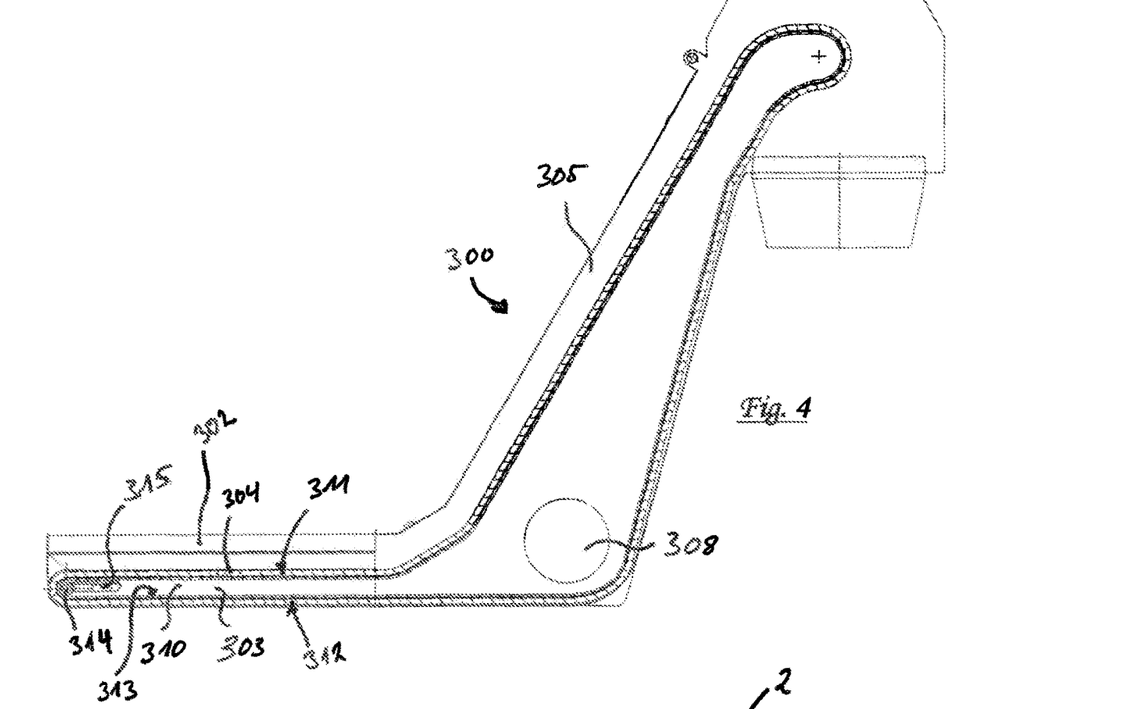
FIG. 4 shows a fourth conveyor device for removing the chips with a filter drum.

FIGS. 2-4 show in a detail view, by way of example, further exemplary conveyors 100, 200 and 300 with a modified manner of separating chips and liquid coolant compared with the first conveyor 1 according to FIG. 1. The conveyors 100 and 200 (FIGS. 2 and 3), like the first conveyor 1, can have an ascending piece 5, a discharge end 6 and a discharge chute 7. The region of the conveyors 100 and 200 leading to the ejection of the chips is less important for the representation of the invention concerned here and is therefore not reproduced in FIGS. 2 and 3. FIG. 4, however, shows this region, since the device for separating liquid coolant and chips is arranged there.

In the following, the matching features of the second conveyor device 100 (FIG. 2), the third conveyor device 200 and the fourth conveyor device 300 are shown together to avoid repetition. The reference numbers in the parentheses refer to the corresponding feature in the other conveyors 200 (FIG. 3) and 300 (FIG. 4), respectively.

The conveyor 100 (200, 300) has an endless belt 104 (204, 304), which can be constructed, for example, in accordance with or similar to the first endless belt 4 for the first conveyor device 1 or can be structured differently. The endless belt 104 (204, 304) forms an upper run 111 (211, 311) and a lower run 112 (212, 312) in the front region of the conveyor device 100 (200, 300). The transition from the lower run 112 (212, 312) to the upper run 111 (211, 312) is via the belt return device 114 (214, 314). Coolant and chips pass via the feed opening 102 (202, 302) into a tank 103 (203, 303).

The second conveyor 100 (FIG. 2) has no filter box or other separate filter device, but rather leads the coolant out of the tank 103 via outlet openings 120. It is assumed that when filling the chip/coolant mixture, a sufficiently large part of the chips remains on the upper run 111 and is transported away. Chips emerging through the outlet openings 120 from the second conveyor 100 are ignored or captured with a separate filter measure.

The third conveyor 200 has below the plane of a tank bottom 219 filter chambers 208, which are delimited from the tank 203 with a filter strap, not shown here. The filtrate of the coolant enters a clean tank (not shown) via outlet openings (not shown).

The fourth conveyor 300 (FIG. 4) has in the ascending piece 305, as a filter measure, a rotatable filter drum 308 which is covered with a filter material and has an outlet opening for the filtrate in the region of a rotation axis. Filter material, rotation axis and outlet opening are not shown for the fourth conveyor 300.

For the second to fourth conveyors 100, 200 and 300, as for the first conveyor 1, chips are moved into an intermediate space 110 (210, 310) between upper run 11 (111, 211, 311)

and lower run 12 (112, 212, 312) and can attach to the intermediate space side 113 (213, 313) of the endless belt 104 (204, 304) facing the intermediate space 10 (110, 210, 310) in the lower run 112 (212, 312).

For all conveyors 1, (100, 200, 300), the problem arises that the chips accumulating on the intermediate space side 113 (213, 313) are conducted with the endless belt 4, (104, 204, 304) to the belt return device 14 (114, 214, 314) and accumulate there and interlock with one another and can form disruptive structures that can only be removed by expensive measures. In order to avoid the formation of such structures, the endless belt 4, (104, 204, 304) has passage openings for the chips, not visible in FIGS. 1 to 4, but illustrated in detail in the following figures. In addition, deflection means 15, (115, 215, 315) are provided on the deflecting device 14, (114, 214, 314) or in its vicinity, which deflection means are shown only symbolically in FIGS. 1 to 4 and of which exemplary variants are described in more detail in the following figures.

All exemplary structures of endless belts and deflection means shown below and modifications thereof can be used for all conveyors 1, 100, 200 or 300 shown by way of example or can be used for modifications thereof.

Figure 6:
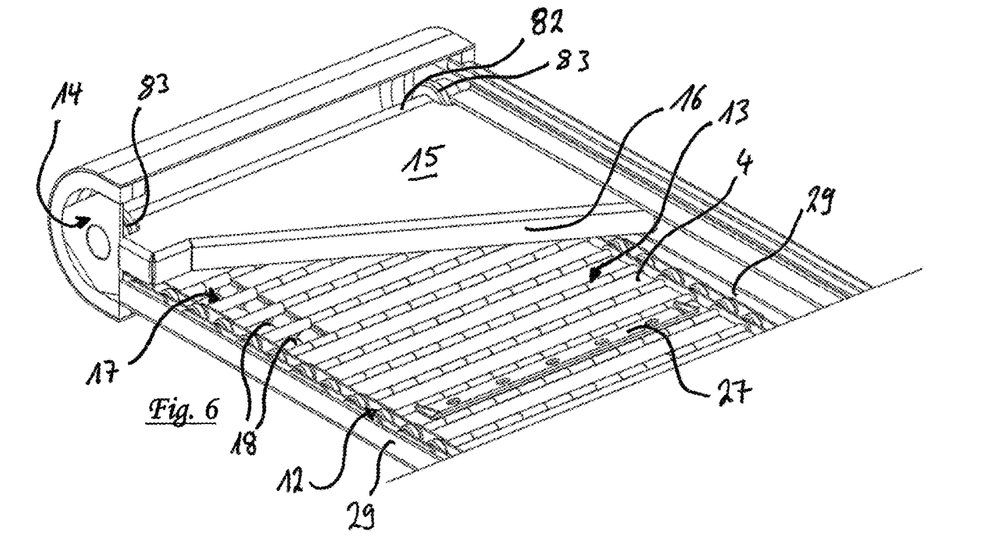
FIG. 6 shows a first deflection means in the region of a first belt return device together with the lower run (partial) of a first endless belt.

FIG. 6 shows a detail oblique top view of the first deflecting device 14 together with a part of the endless belt 4 in a first embodiment (hereinafter first endless belt 4) in the lower run 12 and a first deflection means 15. The upper run 11 is not shown in FIG. 6 to allow the view of the deflection means 15. The driven first endless belt 4 moves in the lower run 12 to the first belt return device 14 and thus to the first deflection means 15. Chips (not shown) located on the intermediate space side 13 of the first endless belt 4 are deflected by the deflecting edge 16 obliquely extending in the conveying direction to the left. Said deflection edge 16 is an exemplary embodiment of the deflection strip as mentioned in the claims. The first endless belt 4 has a lateral passage track 17, which has a plurality of passage openings 18, of which only two are marked in FIG. 6 with reference numerals. The passage openings 18 allow the passage of chips through the endless belt 4 so that they can leave the intermediate space 10 (see FIG. 2) and land on a tank bottom 19 (see FIGS. 1 and 5) of the tank 3. In the case of the third conveyor 200 (FIG. 3), the chips may also land on one of the filter chambers 208.

Figure 7:
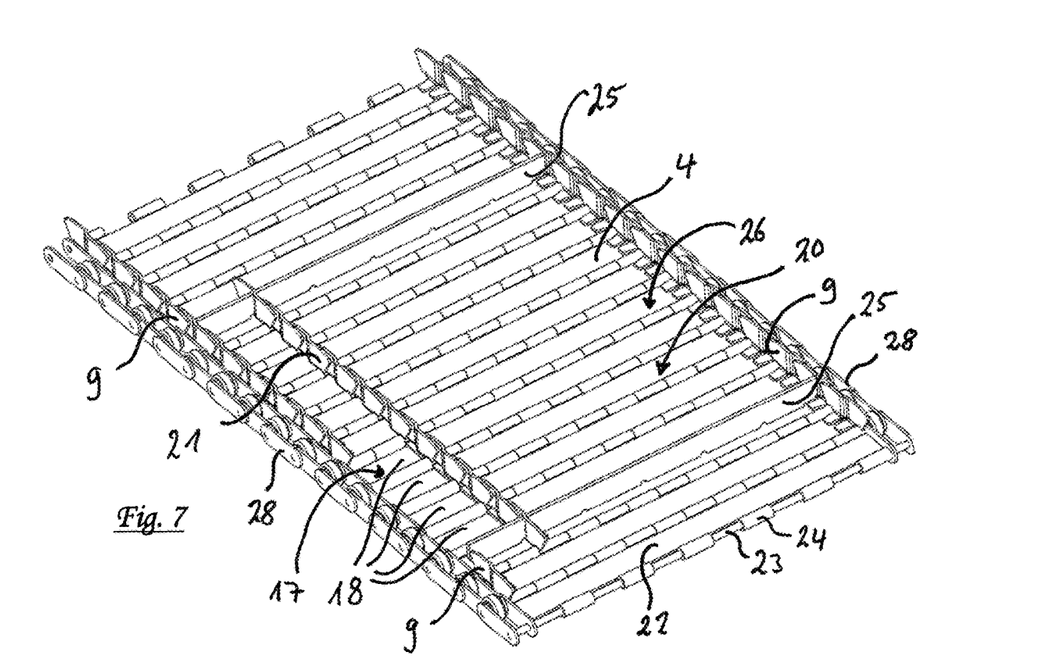
FIG. 7 is a detail view of the first endless belt in the region of the upper run.

FIG. 7 shows the first endless belt 4 in detail in an oblique top view of an outer side 26 of the endless belt 4 facing away from the intermediate space 10. In this illustration, the side walls 9 of the first endless belt 4 can be seen. Laterally, the first endless belt 4 is bounded by guide chains 28. The first endless belt 4 is driven via the guide chains 28, and guided in the conveyor 1, for example by means of guide rails 29 (see FIG. 6).

The passage track 17 with its passage openings 18 is separated from a conveyor track 20 by an intermediate wall 21. No passage openings 18 are present on the conveyor track 20. The endless belt 4 is in this example a hinge with link plates 22 which are pivotably fixed via joint sleeves 24 encompassing joint rods 23. The endless belt 4 is divided into sectors by outer strips 25 extending transversely to the conveying direction. The outer strips 25 ensure the reliable further transport of the chips resting on the first endless belt 4, in particular via the ascending piece 5 of the conveyor device 1 towards the discharge end 6.

The outer strips 25 located on the outer side 26 of the endless belt 4 also ensure that the chips arriving at tank bottom 19 (119, 219), or in the case of the third conveyor 200 on one of the filter chambers 208, can be transported further via the belt return device 14 away to upper run 11 and thus can be supplied to the outer side 26 of the discharge end 6.

The division of the endless belt 4 into a passage track 17 and a conveyor track 20 is not continuous in the present example, but limited to several sectors of the endless belt 4, wherein in the example shown in FIGS. 6 and 7, the passage track 17 characterized by four passage openings 18 extends only over a section of the sector between the two outer strips 25. It is useful to limit the passage track 17 in length so that the endless belt 4 is available in the areas without passage track on its outside 26 at full width for the transport of the chips to the discharge end 6. In addition, the endless belt 4, with passage tracks limited in their length passage, have a higher stability.

The intermediate wall 21 is continuous between the two outer strips 25. This prevents that chips are flushed with the liquid coolant around the intermediate wall 21 to the passage openings 18 and arrive in the intermediate space 10 (see FIGS. 1 and 5).

FIG. 6 shows an intermediate space strip 27 on the intermediate space side 13 of the endless belt. The intermediate space strip 27 is a pushing element in the sense of the claims and can be, for example, like a shovel. The intermediate space strip 27 has a greater height relative to the joint sleeves 24 and can thus ensure improved transport of the chips resting on the intermediate space side 13. In addition, the intermediate space strip 27 improves the transport of the chips within the belt return device 14 towards the upper run 11. For this purpose, the intermediate space strip 27 cooperates with a peripheral wall 82 of the belt return device 14. The peripheral wall 82, which extends between two belt return guides 83 for the endless belt 4, may be fixed or rotating. The peripheral wall 82 prevents, in conjunction with endless belt 4 guided past the peripheral wall 82 at an appropriate distance therefrom and intermediate space strips 27 possibly mounted thereon or other elevated structures, that intermediate space material carried by the intermediate space side 13 of the endless belt 4, does not, following gravity, slide back or roll into an area under or in front of the belt return device 14 when circulating around the belt return device 14.

In addition, the intermediate space strip 27, after circulation around the belt return device 14, ensures that chips resting on the first deflection means 15 are swept away and land on the intermediate space side 13 of the endless belt 4 in the lower run 12. In the case of the first conveyor 1 (FIG. 1), the intermediate space strip 27 can also detach chips from the upper side and/or the underside of the filter box 8. The tasks of the intermediate space strip 27 can also be achieved by different pushing elements instead of or in addition to the intermediate space strip 27 provided, not shown here, in brush form or with a brush attachment.

The first deflection means 15 and the first endless belt 4 shown in FIGS. 6 and 7 can be used for all variants of the conveyors 1, 100, 200 or 300 (FIGS. 1 to 4) as well as further conveyor systems. The same applies to the further variants of the belt return devices shown below.

Figure 8:
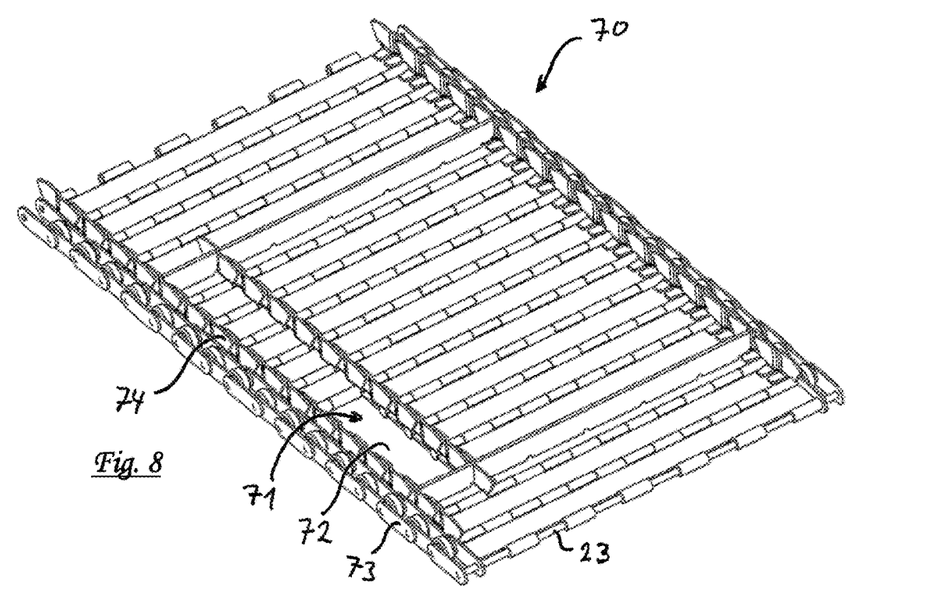
FIG. 8 is a detail view of an alternative second endless belt in the area of the upper run.

FIG. 8 shows a detail of a second endless belt 70, which substantially corresponds to the first endless belt 4 (FIG. 7), but in contrast to the latter has a passage track 71 with a single, continuous passage opening 72. This variant is somewhat more complicated in terms of production, since the joint rods 23 cannot be continuously guided up to the transport chain 73. However, the larger passage opening 72 also ensures the passage of larger chips.

In addition—unlike in FIG. 7—the left side wall 74 is made continuously and has no gap at the level of the passage track 71. The gap in the side wall 9 of the first endless belt 4 shown in FIG. 7 results essentially from the simplification of the production, since the individual, mutually movable elements of the side wall 9 are fixed there to the link plates 22, e.g. by welding. In the variant according to FIG. 8, however, an alternative fixing of the side wall 74 is required at least at the level of the passage opening 72, for example on the guide chain 73. The variant with a continuous passage opening 72 can be provided with interrupted side wall 9.

The two variants of the endless belt 4 and 70 can in principle both be used together with the first deflection means 15 as well as with the alternative deflection means shown below. This applies equally to other variants of the endless belt shown below.

Figure 9:
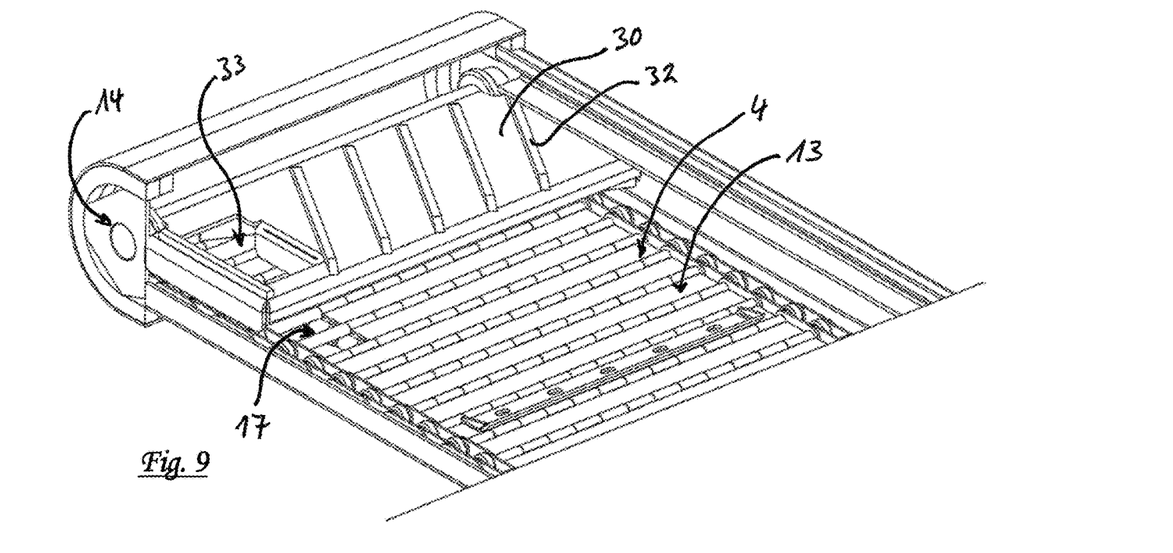
FIG. 9 shows a second deflection means in the region of the first deflecting device in an oblique top view together with the lower run (partial) of the first endless belt.
Figure 10:
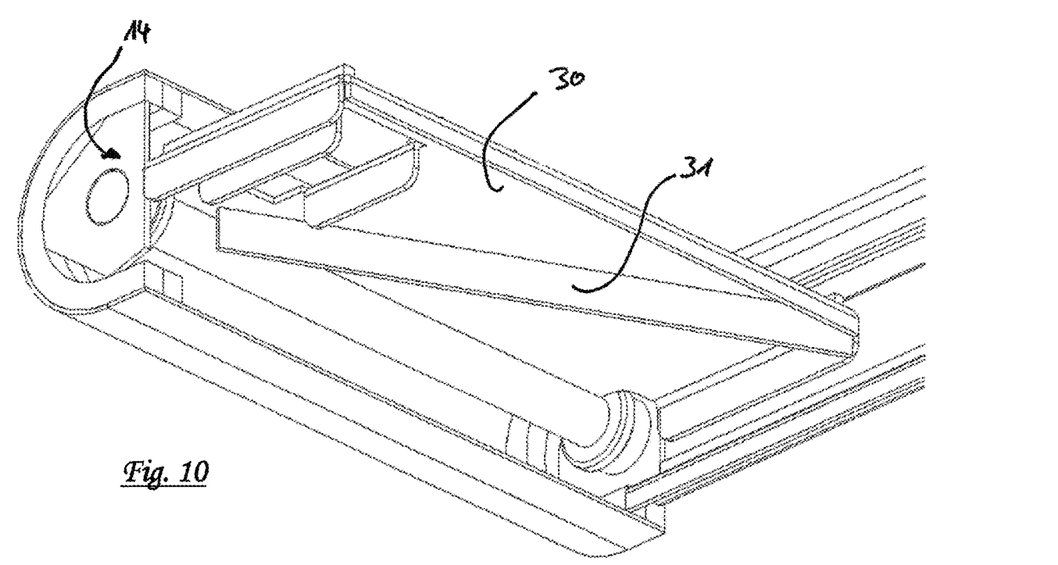
FIG. 10 shows the second deflection means according to FIG. 9, in an oblique bottom view in the region of the first belt return device without an endless belt.

FIG. 9 shows an alternative second deflection means 30 in the region of the belt return device 14. The second deflection means 30 interacts with the first endless belt 4. FIG. 10 shows the second deflection means 30 in an oblique bottom view. The second deflection means 30 comprises on its underside a lower deflection strip 31, which, like the deflection edge 16 at the first deflection means 15 with driven endless belt 4, is intended to deflect chips in a direction towards the passage track 17 (see FIG. 9).

In addition, on an upper side of the second deflection means 30 are upper deflection strips 32, which serve to deflect chips which have passed the lower deflection strip 31 without reaching the passage track 17 or an area provided for the passage track 17, further in the direction of the passage track 17. The second deflection means 30 additionally has a drop opening 33, through which chips can fall on the underlying passage track 17 of the first endless belt 4 or on the intermediate space side 13 of the first endless belt 4. The second deflection means 30 is kept short in order to save material, so that the upper deflection strips 32 which are further spaced from the drop opening 33 cannot completely deflect the chips to the passage track 17. Thus, chips may require multiple passes over the belt return device 14 to reach the passage track 17.

Figure 11:
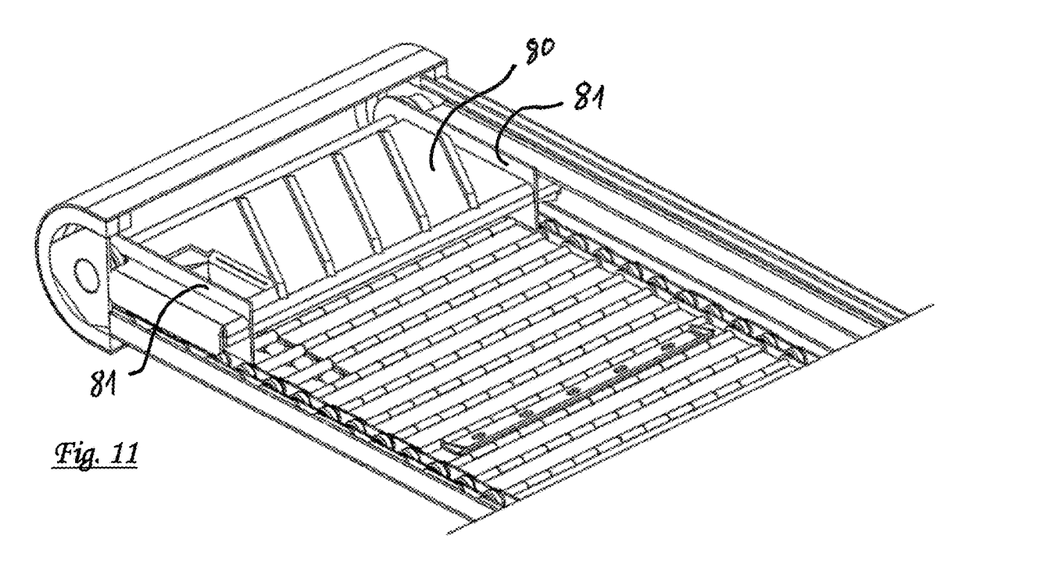
FIG. 11 shows the second deflection means in the view according to FIG. 9 with lateral protective walls.

FIG. 11 shows a third deflection means 80, which has as its sole difference from the second deflection means 30 (FIG. 9) lateral protective walls 81 which prevent chips located on the deflection means 80 or under the deflection means 80 from reaching laterally into the region of the guide chains 28 of the endless belt 4. It is also possible to provide only one protective wall 81, namely on the side on which the passage tracks are located.

Figure 12:
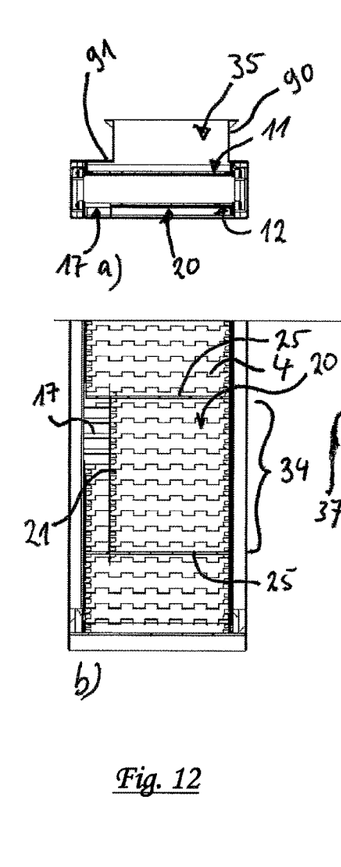
FIG. 12(a) is a cross-section view of the front end of a conveyor with a third endless belt with a lateral passage track.
FIG. 12(b) is a top view of the front end of a conveyor with a third endless belt with a lateral passage track.

FIGS. 12(*a*)-15(*b*) show various exemplary design options for conveyors and the associated endless belts. In each case, the conveyor is shown in the region of the feed opening for the coolant and the chips in cross-section (a) and a bottom view (b) on the endless belt in the lower run.

FIGS. 12(*a*) and 12(*b*) show the first endless belt 4, in which one of the sectors 34 is visible, in which the endless belt 4 is divided into the conveying track 20 and the passage track 17, separated by the intermediate wall 21. The sector 34 is delimited by the outer strips 25. The feed opening 35 is arranged offset in such a way that the chips passing through do not reach the passage tracks 17, to the extent possible, when they are in the upper run 11. A cover portion 91 of a frame 90 providing the feed opening 35 covers a region of the endless belt 4 foreseen for the passage tracks 17. This prevents an unnecessarily high proportion of chips from entering the intermediate space 10 between the upper run 11 and the lower run 12.

Figure 13:
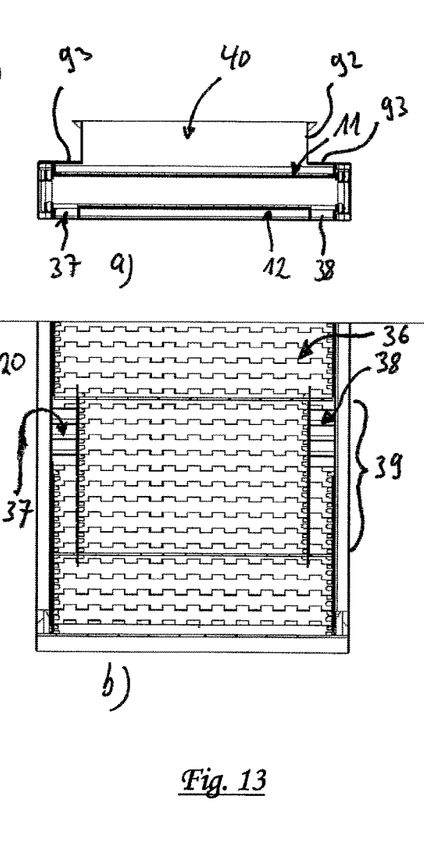
FIG. 13(a) is a cross-section view of the front end of a conveyor with a fourth endless belt with two lateral passage tracks.
FIG. 13(b) is a top view of the front end of a conveyor with a fourth endless belt with two lateral passage tracks.

FIGS. 13(*a*) and 13(*b*) show a third endless belt 36 with two lateral passage tracks 37 and 38 arranged on opposite sides and in the same sector 39. Again, the frame 92 for the feed opening 40 has cover portions 93 (see FIG. 8(*a*)), such that the passage tracks 37 and 38, once they are in the upper run 11, are not directly loaded with passing chips.

Figure 14:
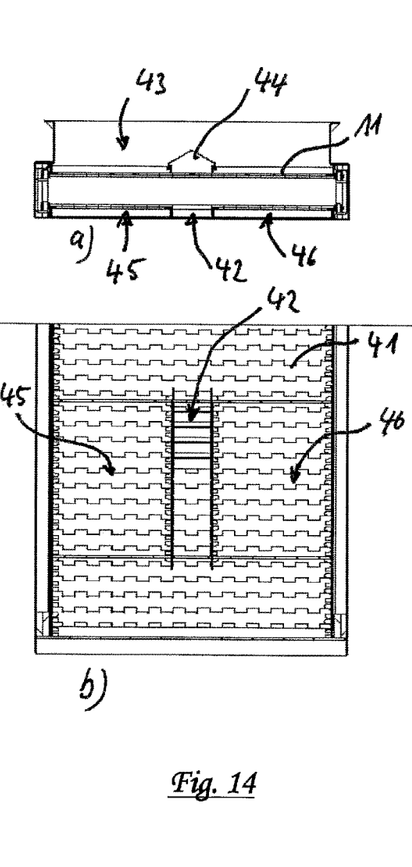
FIG. 14(a) is a cross-section view of the front end of a conveyor with a fifth endless belt with a central passage track.
FIG. 14(b) is a top view of the front end of a conveyor with a fifth endless belt with a central passage track.

FIGS. 14(*a*) and 14(*b*) show a variant with a fourth endless belt 41, which has central passage tracks 42, each extending between two conveying tracks 45 and 46. In the conveyor, above the endless belt 41 in the upper run 11 a separate cover 44 is provided in a central area to protect the central passage tracks 42. With the cover 44, the passage tracks 42 are protected in the upper run 11 against the passage of chips, so that a continuous feed opening 43 can be provided. The covers may have a roof pitch which prevents the chips from permanently sticking. But a scraper element moving on the cover 44, not shown here, may also be provided to remove chips, parallel to the conveying direction of the endless belt 41.

Figure 15:
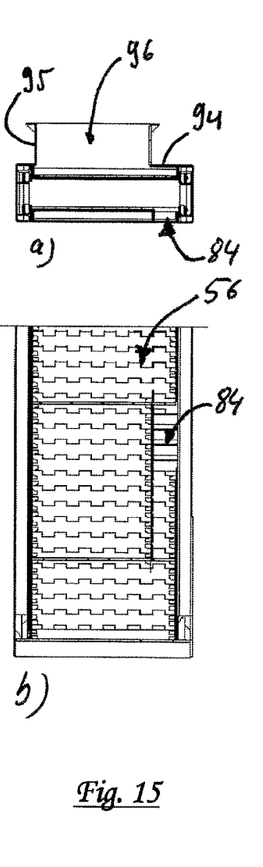
FIG. 15(a) is a cross-section view of the front end of a conveyor with a sixth endless belt with a lateral passage track.
FIG. 15(b) is a top view of the front end of a conveyor with a sixth endless belt with a lateral passage track.

Finally, FIGS. 15(*a*) and 15(*b*) show a variant equivalent to that in FIGS. 12(*a*) and 12(*b*) show. It merely differs from the variant according to FIGS. 12(*a*) and 12(*b*) show in that the lateral passage track 84 of a fifth endless belt 56 and a cover portion 94 of the frame 95 for the feed opening 96 is arranged on the right-hand side in the illustration. Incidentally, reference is made to the description of FIGS. 12(*a*) and 12(*b*) show.

Figures 16, 17, 18, 19:
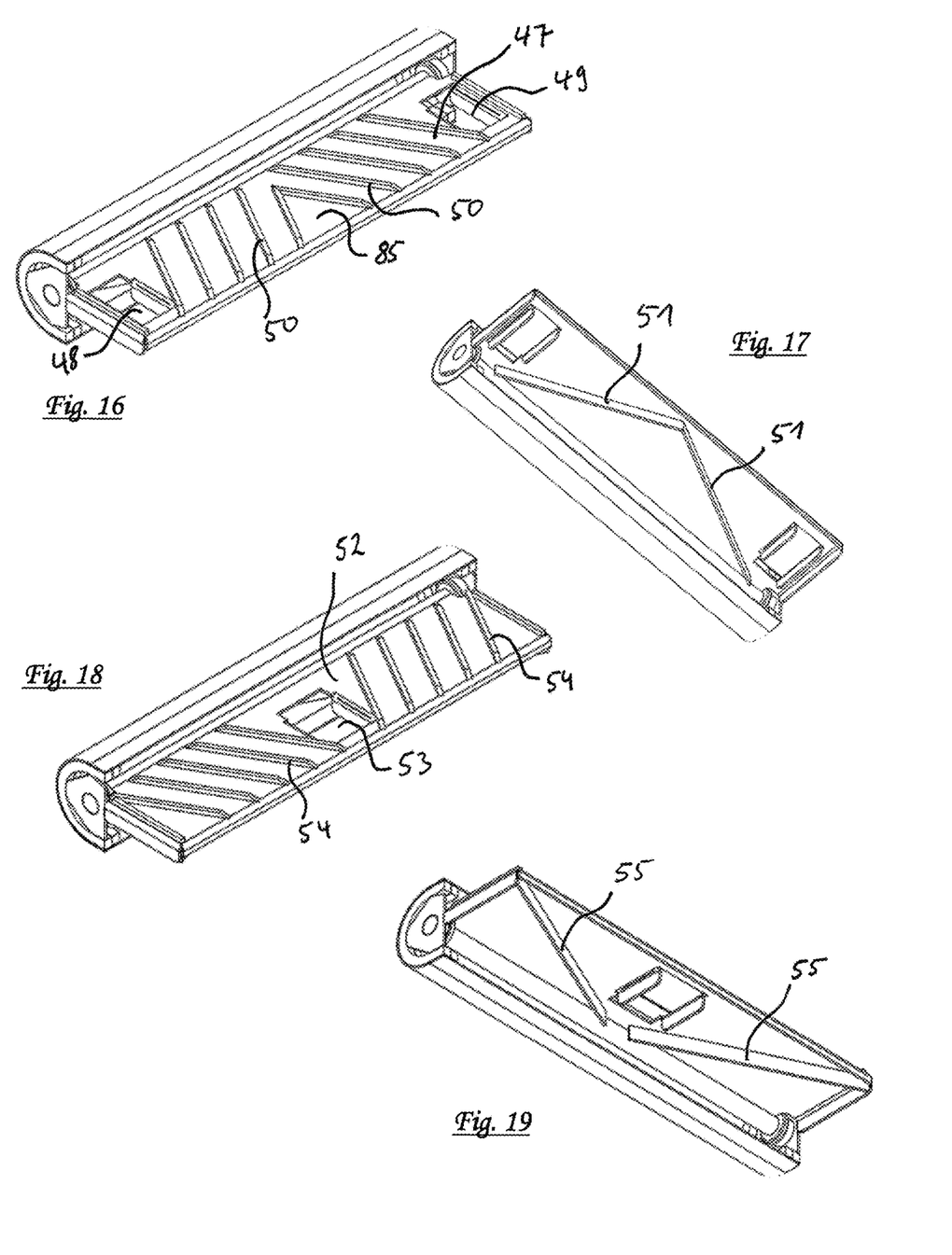
FIG. 16 shows a third deflection means in the region of the first belt return device in an oblique top view.
FIG. 17 shows the third deflection means according to FIG. 16 in oblique bottom view.
FIG. 18 shows a fourth deflection means in the region of the first belt return device in an oblique top view.
FIG. 19 shows the fourth deflection means according to FIG. 18 in an oblique bottom view.

FIG. 16 shows in an oblique plan view and FIG. 17 in an oblique bottom view a fourth deflection means 47 with two lateral drop openings 48 and 49 in a base plate 85, which may serve for example for the variant of the third endless belt 36 of FIGS. 13(*a*) and 13(*b*) show. Upper deflection strips 50 and lower deflection strips 51 deflect the chips on the lower run 12 and on the upper run 11 in the direction of the passage tracks (37 in FIGS. 13(*a*) and 13(*b*) show).

FIG. 18 shows in oblique plan view and FIG. 19 in bottom view, a fifth deflection means 52, which has a central drop opening 53. Upper deflection strips 54 and lower deflection strips 55 direct the chips to a central passage track, as shown in the example of FIGS. 14(*a*) and 14(*b*) show.

Figure 20:
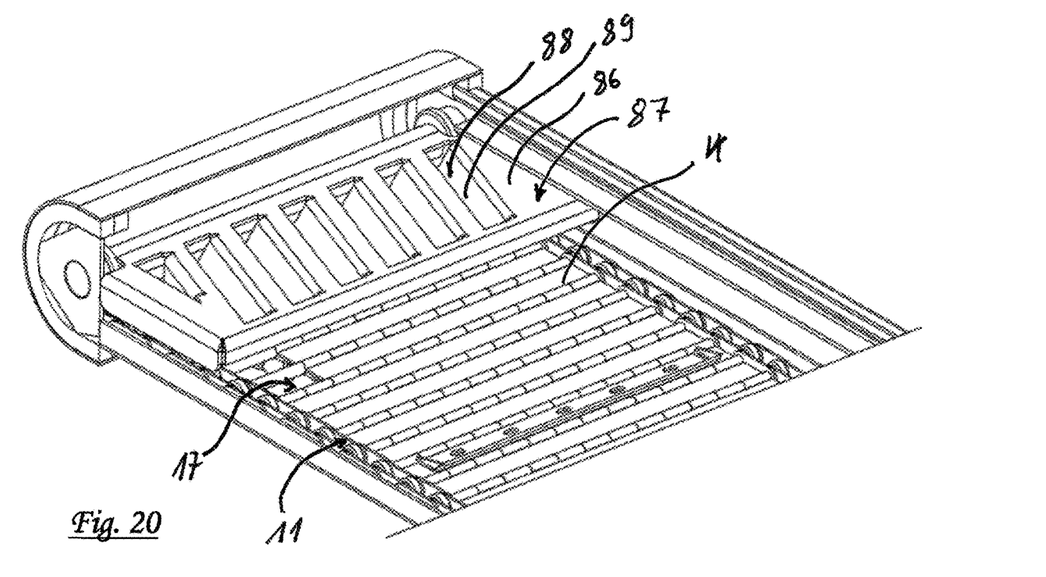
FIG. 20 shows a fifth deflection means in an oblique top view with drop openings and pushing elements.

FIG. 20 shows a sixth deflection means 86 together with the endless belt 4. The sixth deflection means 86 has a plurality of drop openings 88 on a base plate 87, of which in each case a plate-shaped sliding member 89 extends downwards in the direction of the lower run 11. The plate-shaped sliding members 89 are aligned in such a way that chips falling through the drop openings 88 and sliding on the sliding members 89 are deflected in a direction towards the passage track 17.

Figure 21:
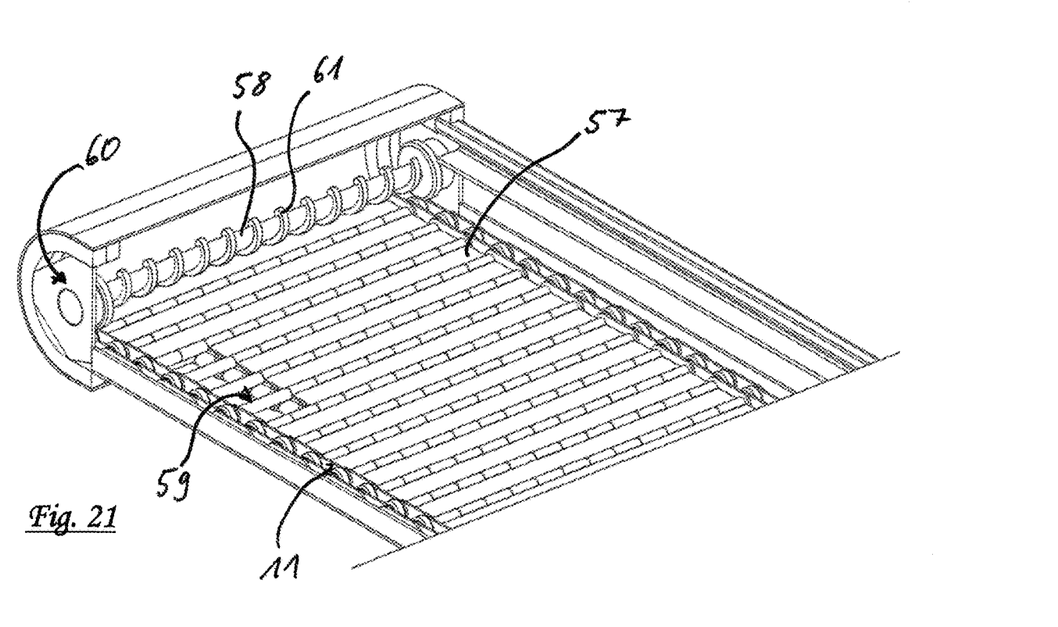
FIG. 21 shows a sixth deflection means in the form of a fixed auger on a second belt return device together with the first endless belt (partial) in the lower run.

FIG. 21 shows a sixth endless belt 57 only in the lower run 11, wherein the sixth endless belt 57, like the first endless belt 4, has passage tracks 59 on only one side. Unlike the first endless belt 4, however, no intermediate space strip 27 (see FIG. 6) is provided. A plate-shaped deflection means is dispensed with. Instead, as a seventh deflection means, a fixed, i.e. non-rotating auger 58 is arranged in a second belt return device 60. The screw thread 61 cooperates with the intermediate space side of the endless belt 57 during the transport of overlying chips and, with the endless belt 57 moving, deflects the chips located on the intermediate space side a little way in the direction of the passage track 59 at each pass. In a variant, not shown here, the auger may also have on different sections at least two screw threads with different thread orientations, which deflects the chips to different passage tracks.

Figure 22:
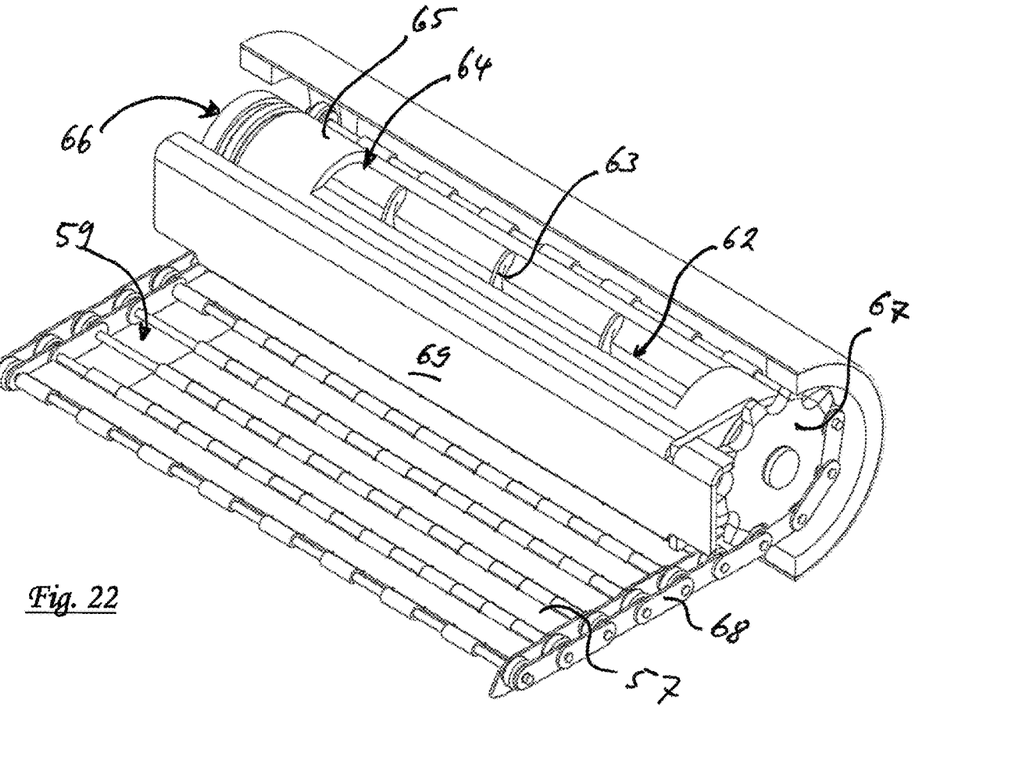
FIG. 22 shows a seventh deflection means in the form of a driven auger on a third belt return device together with the first endless belt (partial) in the lower run.

FIG. 22 shows the sixth endless belt 57 in cooperation with a driven auger 62 as an eighth deflection means. The auger 62 is located in a third belt return device 66 with its screw thread 63 in a screw housing 65 having an inlet opening 64. The screw housing 65 has on its underside an outlet opening, not shown here, which is opposite to the area of the endless belt 57 intended for the passage track 59. As the endless belt 57 passes through the belt return device 66, the chips resting on the intermediate space side of the endless belt 57 fall through the inlet opening 64 into the housing 65 and are guided by the driven auger 62 in the direction of the region of the passage track 59. The driving of the auger is done via a gear 67 of the third belt return device 66, which engages in a guide chain 68 of the endless belt 57.

At the belt return device 66, a barrier 69 is fixed, which causes a leveling of possible accumulations of chips on the intermediate space side of the endless belt 57 in the lower run.

It is also conceivable to combine the different deflection means with one another, such as fixed or driven auger 58 or 62 on the one hand, and plate-shaped deflection means, such as the first to sixth deflection means 15, 30, 80, 47, 52 or 86, on the other hand. The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate the principles of the disclosure and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

What is claimed is:

1. A conveyor for pourable conveying material, the conveyor comprising:
    an endless belt comprising an upper run and a lower run and configured to convey the conveying material in a conveying direction, wherein an intermediate space is defined between the upper run and the lower run;
    a belt return device that facilitates transitioning of the endless belt between the lower run and the upper run; and
    at least one deflection means, wherein:
        the endless belt defines at least one passage opening which allows the exit of at least a portion of an intermediate space material which is formed by a portion of the conveying material which has reached the intermediate space;
        at least a portion of the endless belt comprises a conveyor track and a passage track;
        the passage track defines the at least one passage opening;
        the conveyor track and the passage track are arranged side by side in the conveying direction; and
        the at least one deflection means is arranged to guide at least a portion of the intermediate space material in a direction towards the passage track.

2. The conveyor according to claim 1, wherein the at least one deflection means is arranged between the upper run and the lower run and comprises at least one deflection strip extending obliquely to the conveying direction.

3. The conveyor according to claim 2, wherein the at least one deflection strip is aligned with the lower run such that it cooperates with the lower run.

4. The conveyor according to claim 2, wherein the at least one deflection strip is aligned with the upper run so that it cooperates with the upper run.

5. The conveyor according to claim 2, wherein the at least deflection strip comprises a pair of deflection strips and one deflection strip of the pair of deflection strips cooperates with the lower run and another deflection strip of the pair of deflection strips cooperates with the upper run.

6. The conveyor according to claim 2, wherein the at least one deflection means defines at least one drop opening in a base plate.

7. The conveyor according to claim 6, further comprising a sliding member obliquely oriented to a gravitational direction and extending below the at least one drop opening.

8. The conveyor according to claim 1, wherein the at least one deflection means comprises an auger arranged in the belt return device.

9. The conveyor according to claim 8, wherein the auger is fixed.

10. The conveyor according to claim 8, wherein the auger is driven.

11. The conveyor according to claim 10, wherein the auger is enclosed by a housing.

12. The conveyor according to claim 11, wherein the housing defines at least one inlet opening that extends above a longitudinal axis of the auger and is configured to allow passage of the intermediate space material.

13. The conveyor according to claim 12, wherein the housing defines at least one outlet opening that is disposed above the passage track and is configured to allow passage of the intermediate space material.

14. The conveyor according to claim 11, wherein the housing is part of the belt return device.

15. A conveyor for pourable conveying material, the conveyor comprising:
    an endless belt comprising an upper run and a lower run and configured to convey the conveying material in a conveying direction, wherein an intermediate space is defined between the upper run and the lower run; and
    a belt return device that facilitates transitioning of the endless belt between the lower run and the upper run, wherein:
        the endless belt defines at least one passage opening which allows the exit of at least a portion of an intermediate space material which is formed by a portion of the conveying material which has reached the intermediate space;
        at least a portion of the endless belt comprises a conveyor track and a passage track;
        the passage track defines the at least one passage opening;
        the conveyor track and the passage track are arranged side by side in the conveying direction;
        the belt return device comprises belt return guides and a peripheral wall;
        the peripheral wall extends in the axial direction of the belt return device between the belt return guides; and the peripheral wall cooperates with the endless belt to facilitate transporting of the intermediate space material around the belt return device.

16. The conveyor according to claim 15, wherein the endless belt comprises elevated structures on its inner side facing one or more of the intermediate space and the peripheral wall of the belt return device.

17. The conveyor according to claim 16, wherein the elevated structures of the endless belt each comprise at least one pushing element extending at least partially across a width of the conveyor track.

18. The conveyor according to claim 17, wherein each of the at least one pushing elements comprises one of a flexible lining or a brush-like attachment.

19. The conveyor according to claim 17, wherein each of the at least one pushing elements is formed of a flexible material.

20. The conveyor according to claim 15, wherein:
the at least one deflection means comprises an auger arranged in the belt return device;
the auger is driven and is enclosed by a housing; and
the peripheral wall of the belt return device is at least part of the housing.

21. A conveyor for pourable conveying material, the conveyor comprising:
an endless belt comprising an upper run and a lower run and configured to convey the conveying material in a conveying direction, wherein an intermediate space is defined between the upper run and the lower run, and at least a portion of the endless belt comprises a conveyor track and a passage track;
a belt return device that facilitates transitioning of the endless belt between the lower run and the upper run; and
a cover covering the passage track and disposed above the upper run, wherein:
the endless belt defines at least one passage opening which allows the exit of at least a portion of an intermediate space material which is formed by a portion of the conveying material which has reached the intermediate space;
the passage track defines the at least one passage opening; and
the conveyor track and the passage track are arranged side by side in the conveying direction.

22. The conveyor according to claim 21, wherein at least a part of the cover is provided by a portion of a frame of a feed opening.

\* \* \* \* \*

UNITED STATES PATENT AND TRADEMARK OFFICE
CERTIFICATE OF CORRECTION

PATENT NO. : 10,994,936 B1
APPLICATION NO. : 16/718617
DATED : May 4, 2021
INVENTOR(S) : Mark Andrew Mandzukic et al.

Page 1 of 1

It is certified that error appears in the above-identified patent and that said Letters Patent is hereby corrected as shown below:

In the Claims

Claim 5, Column 14, Lines 4-6, change "the at least deflection strip" to --the at least one deflection strip--.

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*